United States Patent Office 3,392,140
Patented July 9, 1968

3,392,140
METHOD FOR THE PRODUCTION OF HOMO-
GENEOUS RUBBER-SILICA MIXTURES
Gunther Maahs and Gerhard Berg, Marl, Germany, assignors to Chemische Werke Huls Aktiengesellschaft, Marl, Kreis Recklinghausen, Germany, a corporation of Germany
No Drawing. Filed Oct. 18, 1962, Ser. No. 231,583
Claims priority, application Germany, Mar. 17, 1962, C 26,516
2 Claims. (Cl. 260—41.5)

It has already been proposed to produce homogeneous rubber-silica mixtures from synthetic rubber latices and alkali metal silicate solutions by precipitation in the presence of electrolytes by means of acids at certain concentrations, temperatures and defined moments of acid addition. To this end latices are used which contain an emulsifier system that is only stable in the alkaline pH range, that is, which coagulate only after addition of acids beyond the neutral point. As emulsifiers alkali metal salts of higher molecular weight fatty acids, resinates or mixtures thereof can be used.

It is also known to mix alkali metal silicate solutions with a cation-active emulsifier and natural rubber latex and to precipitate this mixture homogeneously with acid. In this case, however, the working conditions are such that no coagulation of the latex sets in before the silica precipitation is completed, and the adsorption of the latex on the surface of the silica only starts at the completion of the reaction. In those cases where the coagulation of the latex sets in before the silica precipitation is completed, no homogeneous, finely-powdered precipitation of rubber and silica is achieved.

It has been found that homogeneous rubber-silica mixtures can be obtained from mixtures of rubber latices and alkali metal silicate solutions by precipitation with acids and/or neutral electrolytes, if synthetic rubber latices are used whose emulsifier systems contain cation-active emulsifiers.

These latices in admixture with alkali metal silicate solutions can be precipitated homogeneously even under conditions of concentration, temperature and time of acid addition, under which common coagulation of a mixture of a latex rubber with an anion active emulsifier system and alkali metal silicate is not possible. Besides, the presence of cation-active emulsifiers has the advantage that the precipitation can be completed at pH 6, and that acids need not necessarily be added in quantity sufficient to give lower pH values.

The difference with regard to the known method of common precipitation of natural rubber latices and alkali metal silicate solutions consists in that the synthetic rubber latex with the cation-active emulsifier system completely coagulates after addition of alkali metal silicate solutions. Surprisingly, the silica upon precipitation from the aqueous alkali metal silicate solutions is completely adsorbed by the already coagulated rubber, that is, there is a complete adsorption of the silica on the rubber, while in the known method the rubber is adsorbed on the already precipitated silica.

By cation-active emulsifiers are meant the known compounds, such as quaternary, nitrogenous organic salts, for example, tetraalkyl ammonium halides, alkylaryl ammonium halides, quaternary pyridinium halides, also tetraalkyl ammonium sulfates and alkylaryl ammonium sulfates. These emulsifiers can be used alone or in mixture with similar compounds or in combination with non-ionogenic emulsifiers for example, alkylphenol polyglycol ethers. Furthermore, the emulsifier system can contain dispersing agents, such as polyvinyl alcohol, tylose, glue and sulfonated lignin derivatives.

Suitable rubber latices for the method are obtained by emulsifying organic polymer solutions and subsequently separating the organic solvent or by polymerizing corresponding monomeric compounds in emulsion. Suitable as polymers are polydiolefines, such as polybutadiene, polychlorobutadiene and polyisoprene, also mixed polymers of several olefines, such as ethylene, propylene and butylene or copolymers of mixtures of diolefines and olefines, particularly vinyl compounds, for example, butadiene-styrene, butadiene-acrylnitrile and ethylene-propylene-hexadiene mixtures.

As alkali metal silicate solution can be used in particular sodium silicate solutions which are available under the designation waterglass. The molar ratio $Na_2O:SiO_2$ is preferably about 1:3.3. The method can be carried out in the presence or absence of neutral electrolytes. By neutral electrolytes we mean the salts of strong acids and strong bases, for example, sodium chloride, potassium chloride, sodium sulfate and potassium sulfate. As acids can be used any inorganic or organic acids, for example, hydrochloric acid, sulfuric acid, carbonic acid, formic acid, acetic acid and sulfonic acids.

Further details are given in the following examples. The special advantage over the previous methods can be seen from the comparison in Example 1.

Example 1

3410 g. of polybutadiene latex, produced by emulsifying a benzene solution of a polybutadiene obtained according to Ziegler and distilling off the solvent, with the following emulsifier system: 5% (related to polybutadiene) of tetradecyl pyridinium bromide, 2% of an alkylphenol polyglycol ether (octylphenol trigintaglycol ether) and 0.5% polyvinyl alcohol, and having a solid content of 22.0% are charged into a 30-liter vessel and 1775 g. of water, 1460 g. of a 25.7% sodium waterglass and 1312.5 g. of a 20% sodium chloride solution are added successively. In this starting dispersion the following concentrations exist:

35 g. of NaCl/l. 50 g. of $SiO_2$/l. and 100 g. of rubber/l. (equals solid/l.). By means of a metering pump 1500 ml. of a 1.5 N HCl are gradually introduced under stirring at 16 to 17° C. within 10 minutes, and a pH value of 8 is attained. The resulting precipitate is heated to 90° C., left standing at this temperature for 10 minutes, and subsequently adjusted with additional acid to pH 6. The precipitate is filtered, washed and dried. The dry, finely powdered product has a $SiO_2$ content of 33.0%.

If, in this method, instead of the latex with the above mentioned emulsifier combination a latex which contains a co-emulsifier consisting of 50 parts potassium oleate and 50 potassium salt of a disproportionate resinic acid is used, there results under the same precipitation concentration, temperatures and times of acid addition a heterogeneous mixture of coarse-flaked rubber and free silica.

EXAMPLE 2

367.5 g. of the latex used in Example 1 (solid content 20.4%) are mixed with stirring with 672 g. of water, 292 g. of a 25.7% sodium waterglass having a molar ratio of $Na_2O:SiO_2$ of 1:3.3, and with 262.5 g. of a 20% sodium chloride solution. The concentrations in this dispersion are: 35 g. of NaCl/l., 50 g. of $SiO_2$/l. and 50 g. of rubber/l. (equals solid/l.). N 320 ml. of 1.5 $H_2SO_4$ are added with stirring at room temperature within 10 minutes. The pH of this mixture is 8. The dispersion is processed as in Example 1. The silica content of the homogeneous precipitate is 50.5%.

EXAMPLE 3

750 g. of the latex used in Example 1 (solid content 20.0%) are mixed with stirring with 2253 g. of water, 292 g. of sodium waterglass and 600 g. of a 20% common salt solution. The concentrations in this dispersion are: 32 g. of NaCl./l., 20 g. of $SiO_2$/l. and 40 g. of rubber/l. (equals solid/l.). Within 58 minutes 340 ml. of 1.5 N HCl are introduced with stirring at 16° C. up to a pH of 8. The further processing is effected as in Example 1. The homogeneous mixture has an $SiO_2$ content of 33.0%.

EXAMPLE 4

682 g. of a polybutadiene latex (solid content 22.0%) which was obtained by emulsifying a benzene solution and subsequent distillation of the benzene, and which contains 3.5% (related to polybutadiene) cetyl trimethylammonium bromide as an emulsifier, are charged into a vessel and mixed under intensive stirring with 351 g. of water, 292 g. of sodium waterglass containing 25.7% $SiO_2$ and with 262.5 g. of a 20% common salt solution. The concentrations in this dispersion are: 35 g. of NaCl/l., 50 g. of $SiO_2$/l. and 100 g. of solids/l. Within 10 minutes, 320 ml. of 1.5 HCl are introduced with stirring at 16 to 19° C. The further processing is effected as in Example 1. The homogeneous product has a $SiO_2$ content of 32.05%.

EXAMPLE 5

542 g. of a polybutadiene latex (solid content 27.7%) with the emulsifier system as in Example 1 are mixed successively with 476 g. of water and 292 g. of sodium waterglass (25.7% $SiO_2$, $d=1.35$). In this starting dispersion the concentrations are: 60 g. of $SiO_2$/l. and 120 g. of rubber/l. (equals solid/l.). The dispersion is heated to 80° C. and mixed at this temperature with stirring within 67 minutes with 400 ml. of 1.5 N HCl. The pH of the suspension is 8. The suspension is heated to 90° C., left standing at this temperature for 10 minutes, and adjusted with additional acid to pH 3. The polybutadiene-silica mixture was filtered, washed and dried. The product has a $SiO_2$ content of 32.8%.

EXAMPLE 6

769 g. of a synthetic rubber latex produced by acid polymerization of 79 parts butadiene and 21 parts styrene in the presence of 4.2% cetyltrimethylammonium bromide (related to the monomer) up to a conversion of 60%, with a solid content of 19.5%, are mixed with stirring with 271 g. of water, 292 g. of a sodium waterglass containing 25.7% $SiO_2$ and 262.5 g. of a 20% NaCl solution. At 16.5° to 19° C. 325 ml. of 1.5 N HCl are added gradually within 11 minutes. The homogeneous, finely divided mixture is processed as in Example 1. The product has a silica content of 31.4%.

We claim:

1. Process for the production of a homogeneous rubber-silica mixture which comprises mixing a synthetic rubber latex selected from the group consisting of polymers and copolymers of unsaturated compounds that are free of basic nitrogen functional groups, said latex containing a cation-active emulsifier selected from the group consisting of quaternary nitrogeneous organic salts, with an alkali metal silicate solution and precipitating the resulting mixture by the addition of a coagulant selected from the group consisting of acids and neutral electrolytes.

2. Process for the production of homogeneous rubber-silica mixtures which comprises mixing a synthetic rubber latex containing a cation-active emulsifier with an alkali metal silicate solution and a neutral electrolyte and precipitating the resulting mixture by the addition of an acid.

References Cited

UNITED STATES PATENTS

| | | | |
|---|---|---|---|
| 3,190,851 | 6/1965 | Maass et al. | 260—41.5 |
| 2,497,447 | 2/1950 | Green | 260—94.2 |
| 2,964,490 | 12/1960 | Howland et al. | 260—41.5 |

OTHER REFERENCES

Iler, Ralph K., The Colloid Chemistry of Silica and Silicates, Cornell University Press, Ithaca, N.Y., 1955, 223–226.

MORRIS LIEBMAN, *Primary Examiner.*

J. H. DERRINGTON, K. B. CLARKE,
*Assistant Examiners.*